United States Patent
Nakamura

(10) Patent No.: US 11,293,652 B2
(45) Date of Patent: Apr. 5, 2022

(54) DEHUMIDIFICATION STRUCTURE

(71) Applicant: YAZAKI ENERGY SYSTEM CORPORATION, Tokyo (JP)

(72) Inventor: Takuju Nakamura, Tokyo (JP)

(73) Assignee: YAZAKI ENERGY SYSTEM CORPORATION, Tokyo (JP)

(*) Notice: Subject to any disclaimer, the term of this patent is extended or adjusted under 35 U.S.C. 154(b) by 0 days.

(21) Appl. No.: 17/098,294

(22) Filed: Nov. 13, 2020

(65) Prior Publication Data
US 2021/0063031 A1    Mar. 4, 2021

Related U.S. Application Data

(63) Continuation of application No. PCT/JP2019/015717, filed on Apr. 10, 2019.

(30) Foreign Application Priority Data

May 25, 2018 (JP) .............................. JP2018-100748

(51) Int. Cl.
*F24F 3/14*    (2006.01)
*F24F 5/00*    (2006.01)

(52) U.S. Cl.
CPC .... *F24F 3/1417* (2013.01); *F24F 2003/1458* (2013.01); *F24F 2005/0064* (2013.01)

(58) Field of Classification Search
CPC ............. F24F 3/1417; F24F 2005/0064; F24F 2003/1458; F24F 3/1411; B01D 53/28
See application file for complete search history.

(56) References Cited

U.S. PATENT DOCUMENTS

2007/0220843 A1    9/2007 Ike et al.
2013/0118101 A1*   5/2013 Mitchell ................... E06B 7/14
                                                            52/209

FOREIGN PATENT DOCUMENTS

| JP | S57-164238 A  | 10/1982 |
| JP | 4-261940 A    | 9/1992  |
| JP | 6-47243 A     | 2/1994  |
| JP | 2016-52610 A  | 4/2016  |
| JP | 2016-77968 A  | 5/2016  |
| JP | 2017-226276 A | 12/2017 |

(Continued)

OTHER PUBLICATIONS

WO 2015170502 translation.*

*Primary Examiner* — Elizabeth J Martin
(74) *Attorney, Agent, or Firm* — Kenealy Vaidya LLP

(57) ABSTRACT

A dehumidification structure includes: a moisture absorbent which has temperature sensitivity for exhibiting hydrophobicity and releasing water at a temperature equal to or higher than a predetermined temperature and for exhibiting hydrophilicity and absorbing water at a temperature lower than the predetermined temperature; a moisture absorbent chamber in which the moisture absorbent is disposed; and a water draining mechanism configured to drain water released from the moisture absorbent and accumulated in the moisture absorbent chamber. The moisture absorbent is provided to allow reception of solar heat or heat from a heating body that is heated by sunlight. The water draining mechanism is configured to drain the water using weight of the water when an amount of water released by the moisture absorbent and accumulated in the moisture absorbent chamber reaches at least a predetermined amount.

3 Claims, 4 Drawing Sheets

(56) References Cited

FOREIGN PATENT DOCUMENTS

WO     WO 2015170502     *   9/2014
WO     2015/170502 A1    11/2015

* cited by examiner

DEHUMIDIFICATION STRUCTURE

CROSS-REFERENCE TO RELATED APPLICATIONS

This application is a continuation of PCT International Patent Application No. PCT/JP2019/015717 filed on Apr. 10, 2019, which claims the benefit of priority of Japanese Patent Application No. 2018-100748 filed on May 25, 2018, the enter contents of which are incorporated herein by reference.

FIELD

One or more embodiments of the present invention relate to a dehumidification structure.

BACKGROUND

In the related art, there are various types of a dehumidification system for air conditioning, one type uses a moisture absorbent which absorbs moisture and then the moisture absorbent is dried with warm air, and another type uses a compressor (with reference to, for example, JP-A-H06-047243 and JP-A-2016-052610). Further, in yet another type, air is blown to a moisture absorbent to cause the moisture absorbent to absorb or release moisture (with reference to, for example, Patent Literature 3 JP-A-H04-0261940).

SUMMARY

A temperature swing method is adopted for a type of dehumidification system for sending warm air after dehumidification is performed by a moisture absorbent. The temperature swing method uses characteristics of the moisture absorbent in which the moisture absorption amount is generally low at the time of low relative humidity and the moisture absorption amount is high at the time of high relative humidity, and the temperature swing method includes lowering relative humidity and release moisture by exposing a moisture absorbent that has absorbed moisture in warm air. For this reason, this type of dehumidification system requires a lot of energy to warm air more than necessary.

Further, in a dehumidification system of a type using a compressor, the compressor compresses air containing moisture, and causes adiabatic expansion after heat dissipation so as to lower air temperature below a dew point to condense water vapor, so that it takes a lot of energy to cool the air more than necessary.

Further, a dehumidification system of a type that blows air to the moisture absorbent also requires driving energy for a blower fan or the like.

Therefore, it is desired to continuously perform dehumidification without requiring electric power.

One or more embodiments of the present invention have been made in view of the above-described circumstances, and an object thereof is to provide a dehumidification structure that allows continuous dehumidification without requiring electric power.

A dehumidification structure according to one or more embodiments of the present invention includes: a moisture absorbent which has temperature sensitivity for exhibiting hydrophobicity and releasing water at a temperature equal to or higher than a predetermined temperature and for exhibiting hydrophilicity and absorbing water at a temperature lower than the predetermined temperature; and a water draining mechanism configured to drain water released by the moisture absorbent and accumulated in a moisture absorbent chamber. The moisture absorbent is provided to allow reception of solar heat or heat from a heating body that is heated by sunlight, and the water draining mechanism is configured to drain the water using weight of the water when an amount of water released by the moisture absorbent and accumulated in the moisture absorbent chamber reaches at least a predetermined amount.

According to the dehumidification structure of one or more embodiments of the present invention, a moisture absorbent has temperature sensitivity for exhibiting hydrophobicity and releasing water at a temperature equal to or higher than a predetermined temperature and for exhibiting hydrophilicity and absorbing water at a temperature lower than the predetermined temperature, and the moisture absorbent is provided to allow reception of solar heat or heat from a heating body that is heated by sunlight. Therefore, at night, the moisture absorbent is lowered to a temperature lower than the predetermined temperature without heating using solar heat or the like, and exhibits hydrophilicity and absorbs moisture from, for example, indoors. Meanwhile, in daytime, the moisture absorbent is heated to a temperature equal to or higher than the predetermined temperature by heating using solar heat or the like, and releases water. Therefore, it is possible to perform dehumidification and regenerate the moisture absorbent without requiring electric power. When the moisture absorbent exhibits hydrophobicity and releases water, the water is released as a liquid, but not as vapor. Further, since the water draining mechanism uses weight of water to drain the water when the amount of water accumulated in the moisture absorbent chamber reaches at least a predetermined amount, the water is drained without requiring electric power. Therefore, dehumidification can be performed continuously without requiring electric power.

BRIEF DESCRIPTION OF DRAWINGS

FIGS. 2A and 2B show a conceptual diagram showing a state of the dehumidification structure according to the first embodiment, in which FIG. 2A shows a moisture absorption state, and FIG. 2B shows a water release state.

DETAILED DESCRIPTION

Hereinafter, embodiments of the present invention will be described. The present invention is not limited to the embodiment to be described below, and can be changed as appropriate without departing from the spirit of the present invention. In the embodiments described below, some configurations are not shown or described, but it goes without saying that a known or well-known technique is applied as appropriate to details of an omitted technique within a range in which no contradiction occurs to contents described below.

Figure 1:
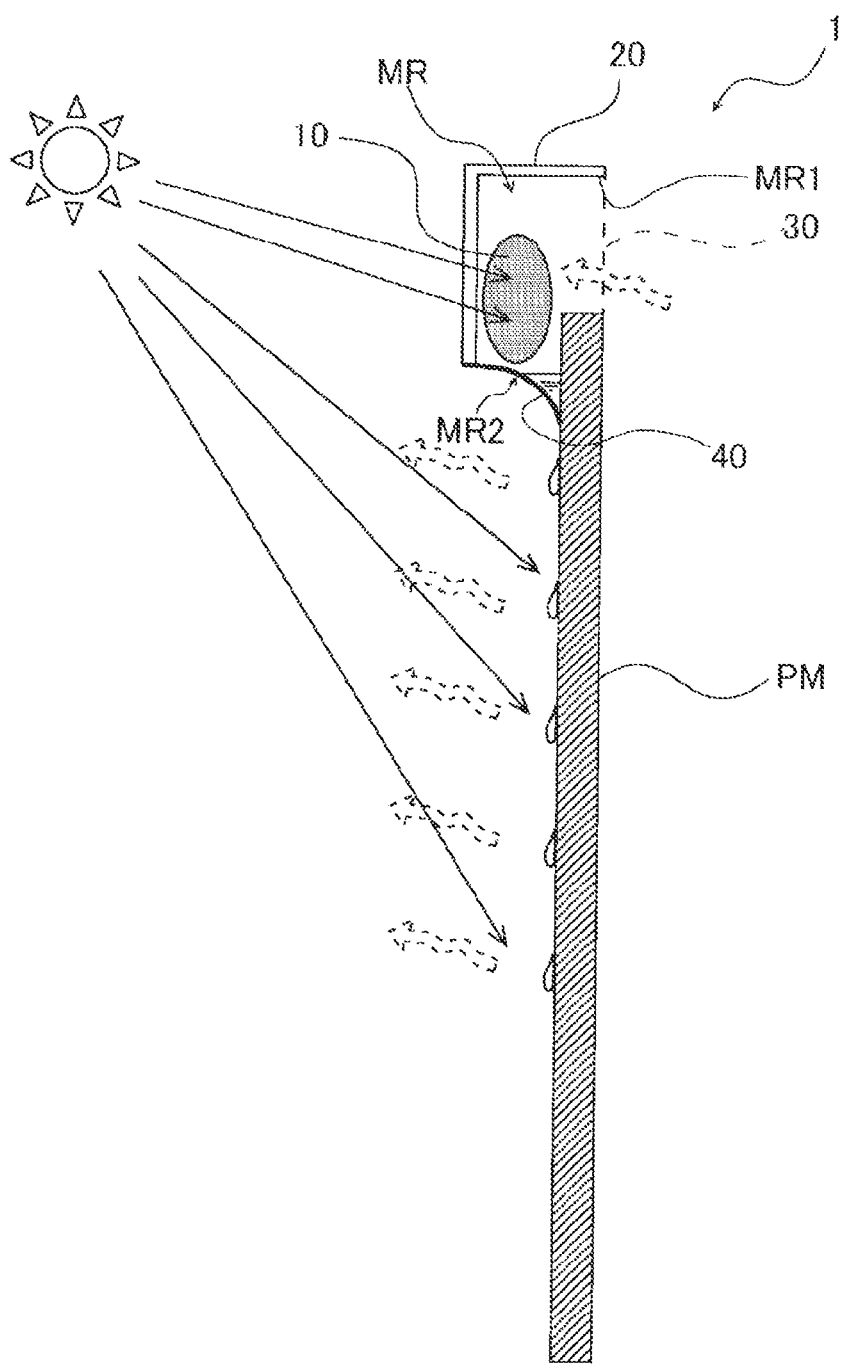
FIG. 1 is a cross-sectional view showing a dehumidification structure according to a first embodiment.

FIG. 1 is a cross-sectional view showing a dehumidification structure according to a first embodiment. As shown in FIG. 1, a dehumidification structure 1 is provided on a partition member PM, for example, a window glass or a wall material that separates indoors and outdoors. The dehumidification structure 1 includes a moisture absorbent 10, a moisture absorbent accommodating wall 20, a moisture permeable member 30, and a water draining mechanism 40.

The moisture absorbent 10 is made of a temperature-sensitive material (temperature-sensitive water-absorbing polymer gel) exhibiting hydrophobicity and releasing water at a temperature equal to or higher than a predetermined temperature (for example, 45 degrees) and exhibiting hydrophilicity and absorbing water at a temperature lower than the predetermined temperature. Examples of such a polymer include an ionized NIPA gel obtained by copolymerizing N-isopropylacrylamide (NIPA) and sodium acrylate (SA). In such a polymer, the predetermined temperature can be adjusted by a polymerization ratio or the like, and can beset to about 45 degrees, for example. Further, when exhibiting hydrophobicity, such a moisture absorbent 10 separates the absorbed water as a liquid, but not as vapor.

The moisture absorbent accommodating wall 20 is a member for forming a moisture absorbent chamber MR in which the moisture absorbent 10 is accommodated and disposed, and is made of a member through which moisture is impermeable and which can absorb or transmit sunlight, in the first embodiment. In particular, in a case where the moisture absorbent accommodating wall 20 can transmit sunlight, the moisture absorbent 10 is accommodated in the moisture absorbent chamber MR so as to be able to receive solar heat. In a case where the moisture absorbent accommodating wall 20 can absorb sunlight, the moisture absorbent 10 is accommodated in the moisture absorbent chamber MR so as to be able to receive heat from the moisture absorbent accommodating wall (heating body) 20 heated by the sunlight. The moisture absorbent chamber MR is provided, for example, on an upper portion of the partition member PM. In the moisture absorbent chamber MR, an opening portion MR1 that is in communication with the indoors and a water draining port MR2 that is in communication with the outdoors are formed. The water draining port MR2 is formed at a position below an installation location of the moisture absorbent 10.

The moisture permeable member 30 is a member provided in the opening portion MRI that connects the moisture absorbent chamber MR and an indoor side. The moisture permeable member 30 is made of, for example, a non-woven fabric, and blocks the opening portion MR1 while allowing moisture to pass therethrough.

The water draining mechanism 40 is a member provided in the water draining port MR2 that is in communication with the outdoors. The water draining mechanism 40 drains water released from the moisture absorbent 10 and accumulated in the moisture absorbent chamber MR. The water draining mechanism 40 uses weight of water to drain the water when an amount of water released by the moisture absorbent 10 and accumulated in the moisture absorbent chamber MR reaches at least a predetermined amount.

Specifically, the water draining mechanism 40 is formed by a rubber lip seal (valve mechanism) that is opened and drains water when an amount of water released from the moisture absorbent 10 and accumulated in the moisture absorbent chamber MR reaches at least a predetermined amount, and is closed when the amount of water accumulated in the moisture absorption chamber MR is less than the predetermined amount. The rubber lip seal is a soft body that is pushed open only downward, and is in close contact with the partition member PM when not being pushed open. Therefore, the rubber lip seal is opened and the water in the moisture absorption chamber MR is drained when the amount of water in the moisture absorbent chamber MR reaches at least the predetermined amount, but when the amount of water is less than the predetermined amount, the rubber lip seal is in a closed state (close contact state) to prevent backflow of water from the outdoors.

Here, the water draining mechanism 40 is not limited thereto, and may be a check valve (valve mechanism) that is opened and drains water when an amount of water released from the moisture absorbent 10 and accumulated in the moisture absorbent chamber MR reaches at least a predetermined amount, and is closed when the amount of water accumulated in the moisture absorption chamber MR is less than the predetermined amount. Further, the water draining mechanism 40 may be configured with a drain trap. In the case where the water draining mechanism 40 is configured with a drain trap, water vapor generated from trap water in the drain trap is absorbed by the moisture absorbent 10, so that the drain mechanism 40 is preferably a valve mechanism.

Further, in the first embodiment, the partition member PM is provided to be exposed to the sunlight and outside air. Furthermore, the water draining mechanism 40 is configured such that the drained water flows down to the partition member PM. Therefore, the water that flows down is vaporized on the partition member PM, and the partition member PM is cooled due to heat of vaporization.

Figure 2A:
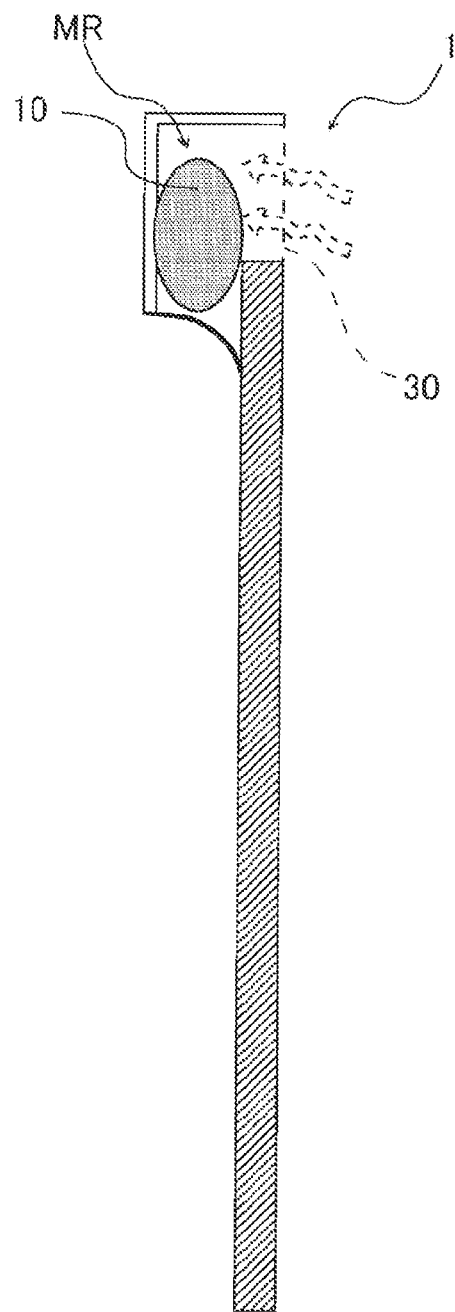
Figure 2B:
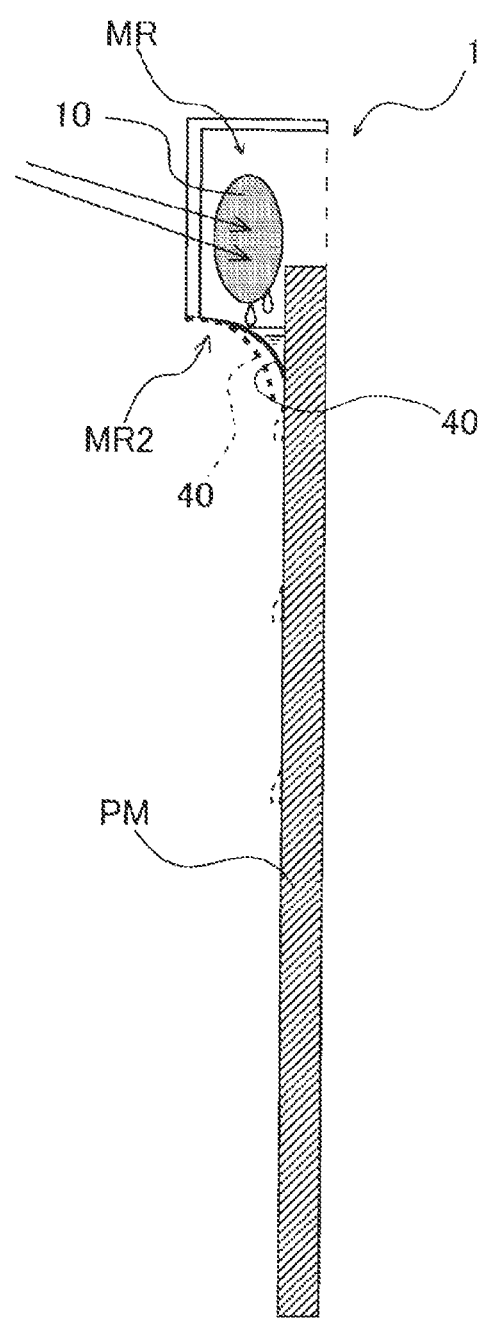

Next, an operation of the dehumidification structure 1 according to the first embodiment will be described with reference to FIGS. 2A and 2B. FIGS. 2A and 2B show a conceptual diagram showing a state of the dehumidification structure 1 according to the first embodiment, in which FIG. 2A shows a moisture absorption state, and FIG. 2B shows a water release state.

First, as shown in FIG. 2A, it is assumed that, for example, at night, the moisture absorbent 10 is not heated by solar heat and is lowered to a temperature lower than a predetermined temperature. At this time, the moisture absorbent 10 exhibits hydrophilicity and absorbs moisture from the indoors through the moisture permeable member 30.

Thereafter, it is assumed that, for example, in the daytime, the moisture absorbent 10 absorbs sunlight so as to be heated to a temperature lower than the predetermined temperature. In this case, as shown in FIG. 2B, the moisture absorbent 10 exhibits hydrophobicity and releases absorbed water. At the time of release, the moisture absorbent 10 releases water as a liquid, but not as vapor. Then, when the amount of water in the moisture absorbent chamber MR reaches at least a predetermined amount, the rubber lip seal serving as the water draining mechanism 40 is pushed open downward (with reference to a broken line in FIG. 2B) due to the weight of water. Accordingly, the water accumulated in the moisture absorbent chamber MR is drained. After the water is drained, the rubber lip seal comes into close contact with the partition member PM again to block the water draining port MR2.

Further, the water draining mechanism 40 drains water such that the water flows down to the partition member PM. The water that flows down is vaporized on the partition member PM. As a result, the partition member PM is cooled by the heat of vaporization, and a cooling effect to the indoors can be exhibited due to cooling of the partition member PM.

Thus, the dehumidification structure 1 of the first embodiment includes the moisture absorbent 10 having temperature sensitivity for exhibiting hydrophobicity and releasing water at a temperature equal to or higher than a predetermined temperature and for exhibiting hydrophilicity and absorbing water at a temperature lower than the predetermined temperature, and the moisture absorbent 10 is provided so as to be able to receive solar heat. Therefore, at night, the moisture absorbent 10 is lowered to a temperature lower than the predetermined temperature without heating using solar heat, and exhibits hydrophilicity and absorbs moisture from, for example, the indoors. Meanwhile, in the daytime, the moisture absorbent 10 is heated to a temperature equal to or higher than the predetermined temperature by heating using solar heat, and release water. Therefore, it is possible to perform dehumidification and regenerate the moisture absorbent 10 without requiring electric power. When the moisture absorbent 10 exhibits hydrophobicity and releases water, the water is released as a liquid, but not as vapor. Further, since the water draining mechanism 40 uses weight of water to drain the water when the amount of water accumulated in the moisture absorbent chamber MR reaches at least the predetermined amount, the water is drained without requiring electric power. Therefore, dehumidification can be performed continuously without requiring electric power.

Further, the dehumidification structure 1 according to the first embodiment includes a rubber lip seal or check valve that is opened and drains water when an amount of water accumulated in the moisture absorbent chamber MR reaches at least a predetermined amount, and is closed when the amount of water accumulated in the moisture absorption chamber MR is less than the predetermined amount. For this reason, it is possible to prevent water from flowing back and invading the indoors after the water draining, and to prevent moisture from being absorbed from a water draining direction.

Further, the dehumidification structure 1 in the first embodiment further includes the moisture permeable member 30. The moisture permeable member 30 is provided in the opening portion MR1 that connects the moisture absorbent chamber MR and the indoor side, and blocks the opening portion MR1 while allowing the moisture to pass therethrough, so that the moisture permeable member 30 is less likely to hinder the moisture absorption from the indoors, and can prevent foreign matters from entering the moisture absorbent chamber MR.

Since the drained water flows down to the partition member PM, and the water can be vaporized on the partition member PM, so that the partition member PM can be cooled by the heat of vaporization. Accordingly, the cooling effect on the indoors can be obtained.

Next, a second embodiment of the present invention will be described. The dehumidification structure according to the second embodiment is the similar to that of the first embodiment, but is partially different in configuration. In the following description, the same components as those of the first embodiment are denoted by the same reference numerals, and description thereof is omitted.

Figure 3:
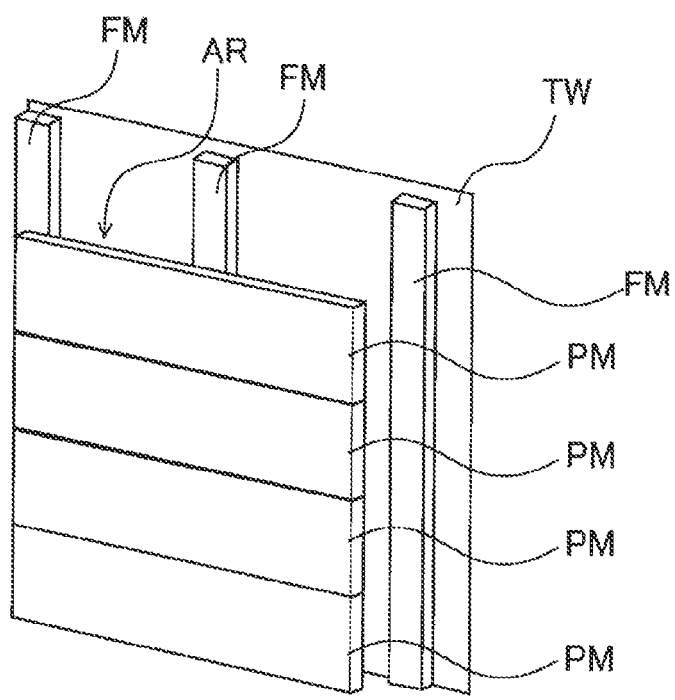
FIG. 3 is a perspective view showing an installation state of a dehumidification structure according to a second embodiment.
Figure 4:
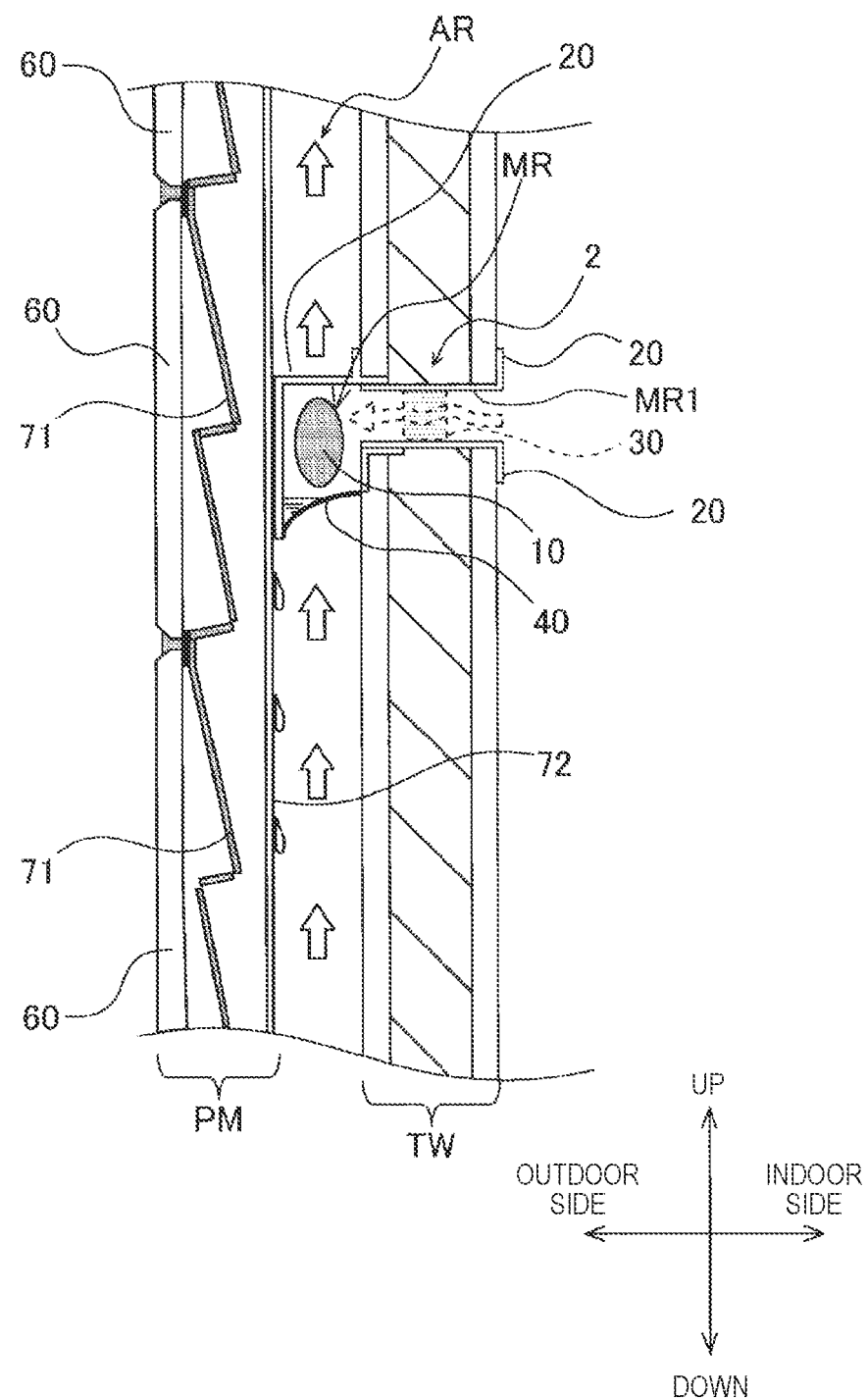
FIG. 4 is a cross-sectional view showing the dehumidification structure according to the second embodiment.

FIG. 3 is a perspective view showing an installation state of the dehumidification structure according to the second embodiment, and FIG. 4 is a cross-sectional view showing the dehumidification structure according to the second embodiment.

FIG. 3 shows the partition member (heating body) PM used as a so-called siding board. As shown in FIG. 4, a dehumidification structure 2 according to the second embodiment is provided on a back surface (indoor side) of the partition member PM.

Hereinafter, description will be given assuming a particularly humid summer season. First, the partition member PM is attached to furring strips FM of a building. For being exposed to solar insolation, the partition member PM absorbs a certain amount of solar heat and a temperature thereof rises during the day. As a result, air in an air passage AR formed between the partition member PM and a heat insulating wall TW of the building is heated. When heat is trapped in the air passage AR, the heat insulating wall TW is also heated and the heat flows to the indoors, so that a lower end and an upper end of the air passage AR are open to the atmosphere such that the air in the air passage AR can be blown upward particularly in summer. The partition member PM may be subjected to selective sunlight absorption treatment on an outer surface 71 thereof in order to particularly improve a heat collecting performance of solar heat, or may be covered with a transparent member 60 so as to further provide an air layer for heat insulation.

Here, the dehumidification structure 2 according to the second embodiment is provided on a back surface side of the partition member PM, as shown in FIG. 4. Similarly to the first embodiment, the dehumidification structure 2 includes the moisture absorbent 10, the moisture absorbent accommodating wall 20, the moisture permeable member 30, and the water draining mechanism 40.

The moisture absorbent accommodating wall 20 in the second embodiment may not be made of the light-transmissive member. In the moisture absorbent chamber MR in the second embodiment, the opening portion MR1 penetrates the heat insulating wall TW to establish communication with the indoors. The moisture permeable member 30 is provided in the opening portion MR1 similarly to the first embodiment, but the moisture permeable member 30 is made of a material having a heat insulating property equal to or higher than a specified value in order to eliminate the adverse effect that the heat insulating wall TW is penetrated.

Further, the water draining mechanism 40 in the second embodiment is configured with a rubber lip seal similarly to the first embodiment, but is configured such that the water flows down to an indoor plate member 72 of the partition member PM but not to the heat insulating wall TW.

Next, an operation of the dehumidification structure 2 according to the second embodiment will be described with reference to FIG. 4.

For being exposed to solar insolation, the partition member PM absorbs a certain amount of solar heat and a temperature thereof rises during the day. The temperature of the partition member PM further rises in a case where the partition member PM is subjected to selective sunlight absorption treatment on the outer surface 71 in order to particularly improve the heat collecting performance of solar heat, or the partition member PM is covered with the transparent member 60 so as to further provide an air layer for heat insulation. Therefore, in daytime, the partition member PM can be heated to heat the moisture absorbent 10, and the moisture absorbent 10 can be heated to a temperature equal to or higher than a predetermined temperature. As a result, the moisture absorbent 10 can exhibit hydrophobicity and release water. Meanwhile, at night, the moisture absorbent 10 is lowered to a temperature lower than the predetermined temperature in a state where the partition member PM is not heated. As a result, the moisture absorbent 10 can exhibit hydrophilicity and absorb water.

When the water released by the moisture absorbent 10 and accumulated in the moisture absorbent chamber MR reaches at least a predetermined amount, the water draining mechanism 40 drains the water to flows down to the indoor plate member 72. The water flows down on the indoor plate member 72 and thus is drained to the outdoors. Further, the water that flows down is vaporized by the air in the air passage AR.

Thus, according to the dehumidification structure 2 of the second embodiment, similarly to the first embodiment, dehumidification can be performed continuously without requiring electric power, and a situation where moisture is absorbed from the water draining direction can be prevented. The moisture absorption from the indoors is less likely to be hindered and foreign matters can be prevented from entering the moisture absorbent chamber MR, and the cooling effect on the indoors can be obtained.

Further, according to the second embodiment, since the water flows down on an indoor side surface of the partition member PM, drained water flowing from the water draining mechanism 40 down to the partition member PM can be hidden, and deterioration in aesthetics appearance can be prevented.

The embodiments of the present invention has been described above, but the present invention is not limited to the embodiments described above, and modifications may be made without departing from the spirit of the present invention, or techniques of the embodiments may be appropriately combined within a possible range. Further, known or well-known techniques may be combined to the present invention within a possible range.

For example, in the above-described embodiment, the moisture absorbent 10 receives sunlight, or is heated by the moisture absorbent accommodating wall 20 or the partition member PM heated by the sunlight, but the present invention is not limited thereto, and for example, the moisture absorbent 10 may be heated by a heating medium or the like (heating body) heated by sunlight.

Further, the partition member PM is made of a window body or a wall material, but is not limited thereto, and may be made of, for example, a roof material as long as the partition member PM separates the outdoor side and the indoor side.

Further, the flowing down water in the first embodiment is vaporized by receiving sunlight, and the water that flows down in the second embodiment is vaporized by the air in the air passage AR, but the present invention is not limited thereto, and the vaporization may be performed simply by the temperature in summer.

In a case where the moisture absorbent 10 is heated by receiving sunlight, an optical member such as a lens or a prism may be provided in order to efficiently rise a temperature of the moisture absorbent 10 to a predetermined temperature or higher. Further, an optical member such as a lens or a prism may be provided to vaporize the water that flows down.

The present application is based on Japanese Patent Application No. 2018-100748 filed on May 25, 2018, the contents of which are incorporated herein by reference.

The invention claimed is:

1. A dehumidification structure comprising:
    a moisture absorbent which has temperature sensitivity for exhibiting hydrophobicity and releasing water at a temperature equal to or higher than a predetermined temperature and for exhibiting hydrophilicity and absorbing water at a temperature lower than the predetermined temperature;
    a moisture absorbent chamber in which the moisture absorbent is disposed;
    a water draining mechanism configured to drain water released from the moisture absorbent and accumulated in the moisture absorbent chamber; and
    a moisture permeable member provided in an opening portion that connects the moisture absorbent chamber and an indoor side, the moisture permeable member being configured to block the opening portion while allowing moisture to pass through,
    wherein the moisture absorbent is provided to allow reception of solar heat or heat from a heating body that is heated by sunlight,
    wherein the water draining mechanism is configured to drain the water using weight of the water when an amount of water released by the moisture absorbent and accumulated in the moisture absorbent chamber reaches at least a predetermined amount, and
    wherein the water draining mechanism comprises a valve mechanism configured to be opened and drain the water when the amount of water released from the moisture absorbent and accumulated in the moisture absorbent chamber reaches at least the predetermined amount, and configured to be closed when the amount of water is less than the predetermined amount.

2. The dehumidification structure according to claim 1, further comprising:
    a partition member which separates an indoor side and an outdoor side,
    wherein the water draining mechanism causes drained water to flow down to the partition member.

3. The dehumidification structure according to claim 2, wherein the water draining mechanism causes the drained water to flow down to an indoor side surface of the partition member.

* * * * *